UNITED STATES PATENT OFFICE 2,365,849

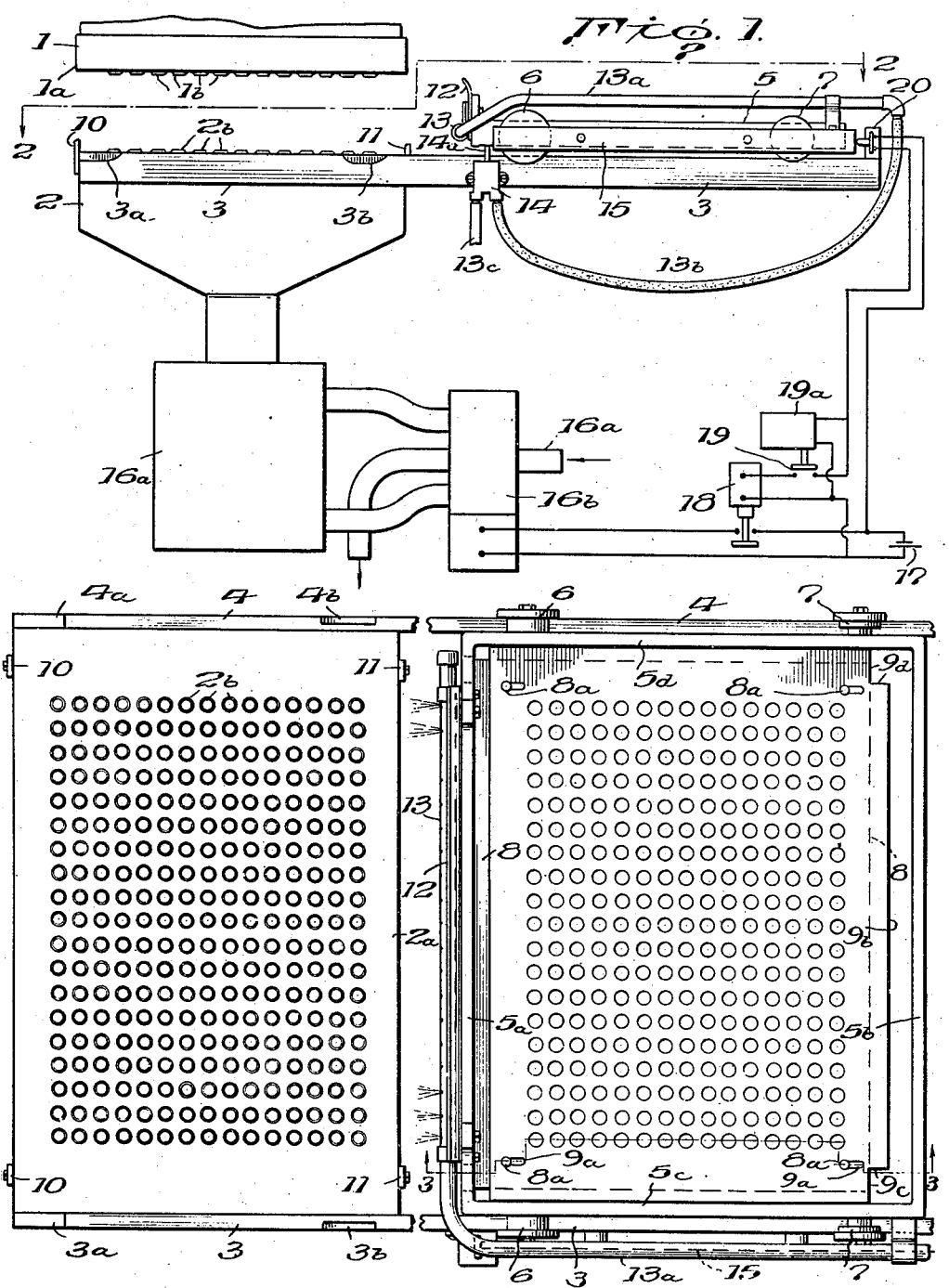

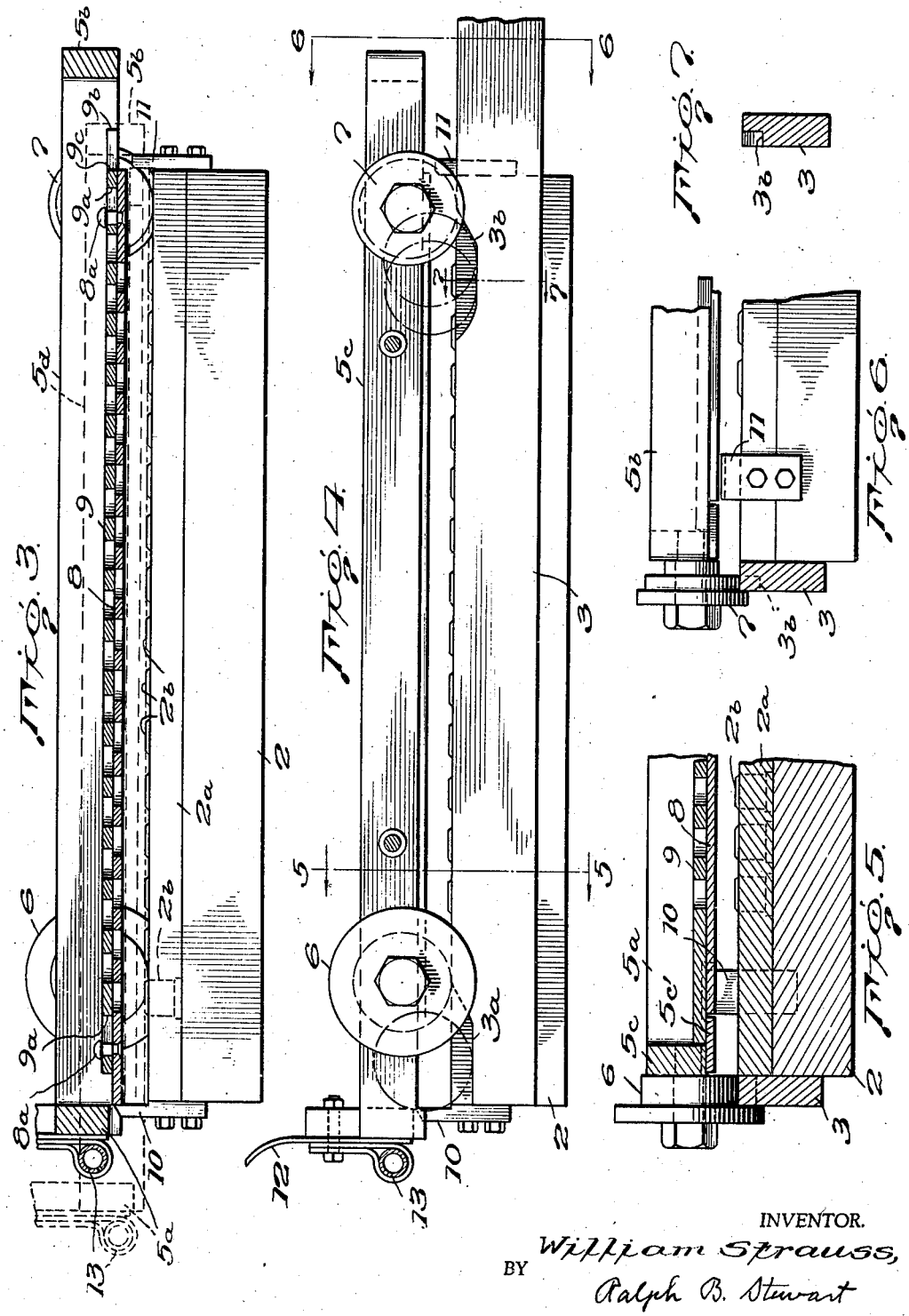

LOADING DEVICE FOR MOLDING PRESSES

William Strauss, Philadelphia, Pa., assignor to F. J. Stokes Machine Company, a corporation of Pennsylvania Application January 19, 1942, Serial No. 427,363

11 Claims. (Cl. 18—30)

This invention relates to a loading device for a molding press. In particular, the invention relates to a device for loading preforms in a multiple cavity molding press.

The specific loading device disclosed herein is designed for loading flat, round preforms in a button-making press, but it will be understood that the invention is not limited in its application to button-forming presses.

Heretofore it has been common practice to use a loading board for loading preforms in a button-forming press, the loading board being formed of two superimposed plates having apertures formed in each board corresponding in number and spacing to the number and spacing of mold cavities in the press. One of the superimposed plates known as the preform positioning plate is positioned over the lower die plate so that the apertures in the positioning plate are in line with the mold cavities in the die plate. The other loading plate known as the feeding plate is located above the positioning plate and is normally displaced with respect to the positioning plate so the positioning plate covers the apertures on the lower side of the feeding plate. The loading board is loaded with preforms by manually scooping the board into a pile of preforms so that a quantity of preforms are placed on the upper surface of the feeding plate and, by shaking the board, a preform becomes positioned in each aperture of the feeding plate. The loading board is then manually placed in the press in position over the lower die plate, and then the delivery plate is shifted with respect to the positioning plate so that the apertures in the delivery plate register with the apertures in the positioning plate and the preforms will then pass through the positioning plate and be deposited in the mold cavities. One difficulty with this prior loading device and procedure is that it requires time for the operator to accurately position the loading board over the die plate, even though positioning pins may be employed for this purpose. Also, when the preforms are released from the feeding plate, some of the preforms will not be deposited correctly in the mold cavities, but may tilt out of the horizontal plane and become "cocked" in the mold cavity.

An object of the present invention is to devise apparatus whereby a loading board of the general type heretofore employed may be easily and quickly manipulated to position the same over the die plate by a simple operation requiring no skill.

A further object of the invention is to devise apparatus for positioning the loading board over the die plate in a manner such that the preforms when deposited in the mold cavities will be properly centered in the cavities and will lie in a horizontal plane. In the loading device according to my invention, provision is made to prevent rotation of the preforms as they are transferred from the feeding plate to the mold cavities.

According to my invention I provide a movable carriage mounted on the press for supporting the loading board when it is being moved into and out of the press. The carriage is so constructed that when moved horizontally into the press, the positioning plate of the loading board first comes into correct position over the mold cavities, and by continued horizontal movement of the carriage, the loading board is automatically lowered into position where the positioning plate is immediately above the mold cavities, and the final stage of horizontal movement of the loading carriage causes shifting of the feeding plate into registry with the positioning plate. After the preforms have been deposited in the mold cavities from the loading board, the loading carriage is then withdrawn in a horizontal direction from the press. The initial horizontal movement of the carriage does not affect any movement of the loading board, but continued withdrawal of the carriage causes the loading board to be raised vertically above the die plate until the loading board is clear of the preforms deposited on the die plate, and further horizontal movement of the loading carriage removes the loading board in a horizontal direction from between the platens of the press.

My invention is also concerned with apparatus for ejecting and discharging the molded articles from the press after each molding operation. For this purpose, I provide a jet pipe mounted on the front of the loading carriage and arranged to direct a series of air blasts downwardly and forward of the carriage as it is moved between the separated platens to blow the molded articles from the lower platen. I also provide a scraper plate mounted on the front of the loading carriage, extending entirely across the carriage and arranged to positively scrape or dislodge any molded article which may be sticking to the mold parts or ejector pins associated with the upper platen.

A further object of my invention is to provide safety means for preventing operation of the press except when the loading carriage is in its fully withdrawn position. I provide means responsive to movement of the loading carriage from its extreme "out" position to cause the press to be operated to its open position.

One embodiment of my invention is illustrated in the accompanying drawings in which:

Figure 1 is a side elevational view of my loading device applied to a molding press, the press being represented in diagrammatic fashion;

Figure 2 is a plan view of Figure 1 on an enlarged scale taken along line 2—2;

Figure 3 is an enlarged view showing the loading carriage and loading plate in sectional elevation taken along the line 3—3 of Figure 2, and showing the lower platen in side elevation, the carriage being positioned above the lower platen and just on the point of being lowered.

Figure 4 is an enlarged view showing the loading carriage and the lower platen in side elevation in the same relative positions as shown in Figure 3;

Figure 5 is a fragmentary sectional view of Figure 4 taken along the line 5—5;

Figure 6 is a fragmentary sectional view taken along line 6—6 of Figure 4 showing the left rear corner of the loading carriage and the lower platen in elevation; and Figure 7 is a sectional view of the rail 3 in Figure 4 taken along line 7—7.

Referring to the drawings, the press may be of any suitable construction and has been diagrammatically represented in Figure 1 by an upper platen 1 and a lower platen 2. A suitable die plate 2a is mounted on lower platen 2 and is provided with a plurality of die elements 2b arranged in spaced relation, and each die element is provided with a mold cavity for the formation of a button or other molded article. The upper platen carries a die plate 1a which is provided with a plurality of die elements 1b corresponding to and cooperating with the die elements 2b on the lower platen. In the case of buttons, the die elements 1a will have cavities cooperating with the cavities in die elements 2b. Suitable ejector pins may be provided for ejecting the molded articles from the die elements associated with either die plate or with both die plates. It will be understood that one of the platens may remain stationary while the other platen is mounted for movement into and out of engagement with the stationary platen, or both platens may be movable, and suitable power means is provided for opening and closing the press. The platens are heated by suitable means when thermo-setting material is used.

The loading device includes a pair of parallel track elements 3 and 4 which may be secured to opposite sides of lower platen 2, or these rails may be secured to some part of the press maintaining a fixed spaced relation with the platen 1. A loading carriage 5 is movably mounted upon tracks 3 and 4 by means of a pair of front wheels 6 and a pair of rear wheels 7. The loading board is mounted in the carriage 5 in a manner to be described below.

Referring to Figure 3, the loading board consits of a positioning plate 8 and a superimposed delivery or feeding plate 9. Both plates 8 and 9 are provided with apertures corresponding in number and spacing to the mold cavities provided in die plate 2a, but the two plates are normally displaced so that plate 8 closes the apertures in plate 9. The two plates are normally held in superimposed relation by means of a pin and slot connection permitting the plate 9 to be moved a distance sufficient for the apertures in the two plates to come into registry.

The loading carriage 5 comprises a rectangular frame consisting of a front member 5a, a back member 5b, and two side members 5c and 5d. Two strips 5c' and 5d' are secured to the lower edge of side members 5c and 5d, respectively, and these strips extend inwardly beyond the inner side of members 5c and 5d to provide ledges for supporting the loading board. As shown in Figure 5, the feeding plate 9 extends beyond the side edge of the positioning plate 8 and rests upon the strip 5c'. In a similar manner, the plate 9 extends beyond the righthand edge of plate 8, and rests upon the strip 5d'. When the loading board is mounted in carriage 5 as shown in Figure 3, the plate 8 is suspended from plate 9 which in turn is supported upon strips 5c' and 5d'.

As explained above, the loading carriage 5 is mounted for movement on rails 3 and 4, whereby the carriage may be moved forward into position between the platens of the press or may be withdrawn into the position shown in Figure 1. As shown in Figure 5, the rims of the front wheels 6 are of a width equal to the width of the rails 3 and 4, but, as shown in Figure 6, the rim of rear wheels 7 is equal to only one-half the width of the rails 3 and 4. At the rear end of rails 3 and 4, notches 3a and 4a are formed in the upper edge of the rail extending entirely across the width thereof whereby during the last portion of the inward movement of the loading carriage, the front wheels 6 ride down into the notches 3a and 4a and thereby lower the front end of the loading carriage. In a similar manner, notches 3b and 4b are formed in rails 3 and 4 so that the rear wheels 7 will descend into these notches simultaneously with the entry of wheels 6 into the notches 3a and 4a. As shown in Figure 7, notches 3b and 4b extend only to the middle of the rail covered by the rim of the wheels 7, thereby leaving the remaining half of the rail unnotched. This arrangement permits wheels 7 to ride down into the notches 3b and 4b on forward movement of the loading carriage, but prevents engagement of the wheels 6 with the notches 3b and 4b when the carriage is drawn back into the position shown in Figure 1.

A pair of fixed stops 10 are mounted on the rear edge of the lower platen and extend up beyond the surface of the die plate carried by this platen. A similar pair of stops 11 are mounted on the front edge of the lower platen and also extend above the surface of the die plate but do not extend up far enough to interfere with loading plate 8 as the frame 5 is moved into the press. Stops 10 extend up far enough to act as a stop for the plate 8 on its inward movement with the carriage 5. The front frame member 5a of the carriage is suitably notched to prevent interference between the frame 5 and the upper ends of stops 10.

Plate 9 is secured to plate 8 by any suitable fastening arrangement which holds the plates together but permits relative sliding of the two plates in the direction of movement of the frame 5. For example, the plates may be held together by means of pins 8a secured to the plate 8 and extending through slots 9a formed in plate 9, the slots 9a being of sufficient length to permit the plate 9 to slide relative to the plate 8 by a distance equal to the diameter of the apertures formed in these two plates, see Figure 3.

The normal position of plates 8 and 9 is shown in Figure 3, and the friction between these two plates tending to hold the plates in their normal position is greater than the friction between the plate 9 and the supporting strips 5c' and 5d'.

In the normal position of the loading board, the front edge of plate 9 is spaced from the front frame member 5a of the carriage 5 by a distance equal to the extent of relative sliding between the two plates 8 and 9, and the back edge 9b of the plate 9 is spaced from the front face of the back frame member 5b of the carriage by a distance equal to the distance through which the carriage must move for the wheels 7 to descend from the top to the bottom of the notches 3b and 4b.

As shown in Figures 2 and 3, the plate 9 is notched in each rear corner as shown at 9c and 9d so as to allow the plates 8 and 9 to be moved vertically downward between the stops 10 and 11 when the plates are in their normal relative position and are positioned over the lower die plate as shown in Figure 3. The plate 8 has a width from front to back which permits the plate to freely enter between stops 10 and 11 while maintaining the apertures of the plate properly centered with respect to the mold cavities in the lower dies 2b.

In using the loading device, the loading board is removed from the carriage 5 and is loaded manually in the usual manner, or it may be loaded from a special loading hopper. The loaded board is then placed in the carriage 5 with the front edge of plate 8 in contact with the rear face of frame member 5a. The frame 5 is manually moved forward on the walls 3 and 4 from the position shown in Figure 1. Nothing happens until the carriage reaches a position where plate 8 comes in contact with stops 10, and at this time, the wheels 6 and 7 are in a position to begin descending into notches 3a—4a and 3b—4b. Further movement of the carriage 5 results in movement of the carriage in a forward direction while the plates 8 and 9 are maintained in the position shown in Figure 3 until the rear frame member 5b comes in contact with the rear edge 9b of plate 9. At this time, the carriage 5 has been lowered in position until the plate 8 is either resting upon the die plate or is slightly spaced therefrom depending upon the depth of the notches in rails 3 and 4, and the apertures in plate 8 are in exact vertical alinement with the mold cavities in the lower die elements 2b. Further movement of the carriage in a horizontal direction causes plate 9 to slide to the left with respect to plate 8 until the front edge of the plate 9 comes in contact with stops 10—10 at which time the apertures in plate 9 come into registry with the apertures in plate 8, and the preforms carried in the apertures in plate 9 pass through the apertures in plate 8 and are deposited in the die cavities of the press. The discharging positions of plates 8 and 9 and of carriage 5 are shown in dotted lines in Figure 3. If desired, a cover plate may be placed on top of plate 9 to prevent the preforms from bouncing out of the apertures in this plate in case the loading frame is moved forward suddenly and the wheels of the carriage drop into the notches on rails 3 and 4 without riding down the inclined portions of the notches.

In withdrawing the loading carriage from the press, the operator simply pulls the carriage out horizontally in the opposite direction from the inward movement. During the initial outward movement of the carriage, while the wheels 6 and 7 are travelling along the flat bottom portion of the notches 3a—4a and 3b—4b, the plates 8 and 9 remain in the discharging position as shown in dotted lines in Figure 3. During the outward movement when the wheels are riding out of the notches in rails 3 and 4, the plates 8 and 9 remain in the same relative position where the apertures in the two plates are in registry, but the loading board is raised vertically from the lower die plate and there is no transverse movement of the loading board with respect to the die plate tending to displace the preforms from the mold cavities. The loading board moves vertically upward until it is completely clear of the preforms, and then it moves from between the platens back to the position shown in Figure 1.

It will be understood that suitable and well known ejector means, such as ejector pins, are provided for ejecting the buttons or molded articles from the mold cavities after each molding operation. Usually matters are arranged so the molded articles will adhere to the upper die members and are ejected therefrom by suitable ejecting means. The ejected articles will lie loosely upon the lower die plate and must be discharged from between the platens. Occasionally a molded article will stick to some of the die members, or to the ejector pins, and it becomes necessary to provide for the positive dislodgment of these articles. For this purpose, I mount a scraper plate 12 on the front end of the loading carriage 5, the plate 12 extending along the front end of the carriage 5 for a distance sufficient to cover the entire width of the active area of the upper die plate. The upper edge of scraper 12 is arranged to pass below the dies or the ejector pins associated with the dies in the upper die plate with a small clearance, but if a molded article remains on one of the die parts, or on the ejector pins, the plate 12 will dislodge the sticking part and it will fall to the lower die plate. For the purpose of discharging the molded articles from between the platens and for clearing the cavities in the lower dies, I mount a jet pipe 13 on the front of loading carriage 5. The pipe 13 is provided with a series of jet holes or nozzles for directing blasts of air downwardly and forward of the carriage to blow the molded articles out of the cavities in the lower dies or off of the surface of the lower die plate and into a suitable receptacle. The jet pipe 13 is supplied with compressed air through a pipe connection 13a arranged along one side of the carriage 5 so as to avoid interference with any part of the press when the carriage is moved between the platens. The pipe 13a is supplied with air through a flexible hose connection 13b leading to control valve 14 which in turn is connected to a suitable source of compressed air through connection 13c. Control valve 14 is mounted in fixed relation to the movable carriage 5 and is provided with a tiltable control element 14a positioned in the path of movement of an operator bar 15 mounted on carriage 5. In the normal vertical position of the control element 14a as shown in Figure 1, the valve is closed, but when the carriage 5 is moved forward the controller element 14a is tilted to the left and valve 14 is opened to supply air through connections 13b and 13a to the jet pipe 13. The valve 14 remains open until the carriage 5 reaches its innermost position at which time the cam bar 15 has passed beyond the control element 14a and the control element returns to its biased or closed position. As the carriage 5 moves forward, the jets of air supplied from pipe 13 will blow the articles from between the platens 1 and 2, and any molded articles which may be stuck upon the upper die parts will be dislodged by scraper 12 and will then be blown from between the platens. On the reverse movement of carriage 5, the valve operator 14a will be tilted to the right and the valve remains in its closed position while the carriage 5 is being withdrawn and will not be opened again until carriage 5 is moved to its extreme "out" position and then moved forward again.

According to my invention, I provide safety means for preventing operation of the press unless the carriage 5 is in its extreme "out" position. For this purpose, I provide safety means for opening the press (if the press is not already open) when the carriage 5 is moved away from its extreme "out" position. One example of such an arrangement is illustrated in Figure 1. Any suitable power device may be employed for operating the press, but one example is shown as involving an hydraulic cylinder 16 which may be operated by fluid under pressure supplied from suitable source through connection 16a and controlled by valve means of known construction and represented at 16b. The valve 16b is electrically operated and is mechanically biased to a position to open the press. Control valve 16b is energized from a suitable supply source represented at 17 and the circuit may be controlled by a relay 18 which in turn is controlled by a suitable switch 19 which may be operated manually or by a controller 19a to cause the press to open and close in any desired sequence. The controller 19a may be of any known or desired construction and may be operated either electrically or mechanically. The circuit for energizing relay 18 is also controlled by a normally open switch 20 mounted at the end of rails 3 and 4 and in a position to be operated to closed position by carriage 5 when the carriage reaches its extreme "out" position. So long as carriage 5 is in the position shown in Figure 1, the energizing circuit for relay 18 is through switch 20, and relay 18 may be energized by suitably operating switch 19. If carriage 5 is accidentally moved from its extreme "out" position, relay 18 will immediately open and valve 16 will move to its biased position to open the press. In the same way, if the press has been opened in its normal operation, the press cannot be closed until carriage 5 is moved back to the position shown in Figure 1.

It will be understood that the scraper 12 is positioned at the front of the carriage 5 so that it will travel at its upper level until it passes beyond the last row of die elements 1b; in other words, wheels 6 and 7 do not begin to enter notches 3a—4a and 3b—4b until scraper 12 has passed the last row of die elements 1b.

While the loading device disclosed herein is especially useful for loading round, flat preforms, it is obvious that the device may be employed to load other shapes of preforms, or even for loading measured charges of loose material.

What I claim is:

1. A device for loading the lower die plate of a molding press comprising, in combination, a loading board capable of being tripped, a carriage for said loading board, said loading board being movably supported by said carriage, means for supporting and guiding said carriage for movement of said board from a position outside of said press to a position in said press over the lower die plate thereof, means for stopping the movement of said loading board when said board comes into proper position above said die plate while permitting continued movement of said carriage, means operative upon continued movement of said carriage for lowering said board to a predetermined point above said die plate, and means thereafter controlled by a further movement of said carriage for tripping said loading board and depositing the loading charges on said die plate.

2. In combination, a molding press having upper and lower platens carrying mold parts, a loading board capable of being tripped, a movable carriage movable supporting said board thereon, means for supporting and guiding said carriage for movement horizontally from a normal position outside of said press to a position between said platens, means for stopping the movement of said loading board when said board comes into proper vertical alignment with the mold parts on the lower platen while permitting continued inward movement of said carriage, means operative upon continued movement of said carriage into said press after said loading board reaches its proper position to lower said board into a predetermined position above the lower mold parts, and means thereafter controlled by a further inward movement of said carriage for tripping said loading board and depositing loading charges on the lower mold parts.

3. A combination according to claim 2 wherein the means for supporting and guiding the movable carriage is effective on outward movement of said carriage from said press to elevate said loading plate above the tripping position, and including stop means for restraining outward movement of said loading board until said board is elevated to a position to clear the charges deposited on the lower mold parts.

4. In combination, a molding press having upper and lower platens carrying mold parts, a loading board, a movable carriage supporting said loading board between said platens and in discharging position above the lower mold parts, guiding means for restraining said loading board against lateral movement but permitting upward movement from said discharging position, and means for supporting and guiding said carriage for movement from between said platens to a position outside of said press, and including means operative upon said movement for imparting vertical movement to said loading board until said board is moved vertically beyond said first mentioned guiding means and for thereafter moving said board outwardly from said press.

5. In combination, a molding press having upper and lower platens carrying mold parts, a pair of horizontal rails mounted on opposite sides of said lower platen, a movable carriage mounted on said rails for movement horizontally along said rails from a position outside of said press to a position between said platens, a loading board movably supported on said carriage, said loading board having an apertured positioning plate and an apertured delivery plate, stop means positioned in the path of said positioning plate to stop said loading board when said positioning plate comes into correct vertical alignment with the mold parts on the lower platen and for holding said loading board stationary while said carriage may be further moved horizontally, said rails having inclined portions for lowering said carriage during continued horizontal movement of the carriage after the loading board has been stopped by said stop means, and means on said carriage for engaging said delivery plate after said carriage has been lowered to a predetermined extent and shifting said delivery plate relative to said positioning plate to cause registry of the apertures in said two plates.

6. A combination according to claim 5 wherein said movable carriage is mounted upon said horizontal rails by a pair of front wheels and a pair of rear wheels, said rear wheels having rims of a width less than the width of said rails, while the rims of the front wheels extend across the entire width of said rails, and wherein the inclined portions of said rails comprise notches formed in said rails, said notches for the front pair of wheels extending entirely across the width of said rails, and the notches for the rear wheels being formed in only those portions of the rails which are engaged by the rims of the rear wheels.

7. A combination according to claim 2 and including a scraper plate mounted on the forward end of said movable carriage and positioned to pass beneath the mold parts carried by the upper platen and to dislodge any molded articles which may be sticking thereto.

8. A combination according to claim 2 and including a scraper element carried by said movable carriage at the forward end thereof and operating to dislodge molded articles from the mold parts carried by the upper platen, and a jet pipe carried by said carriage at the forward end thereof for producing air blasts to blow molded articles from the mold parts of said lower platen.

9. Apparatus for cleaning the mold cavities in a multiple cavity molding press comprising, in combination, a molding press having upper and lower platens carrying mold parts, a pair of horizontal rails mounted on opposite sides of said lower platen, a movable carriage mounted on said rails for movement horizontally along said rails from a position outside of said press to a position between said platens, a jet-pipe mounted on said carriage transversely thereof and having means for directing a series of air blasts against the mold parts as said carriage is moved between said platens, a valve for controlling the admission of compressed air into said jet-pipe, and means controlled by said carriage on the forward movement thereof for opening said valve and for maintaining said valve closed on the reverse movement of said carriage.

10. A combination according to claim 2 and including power means for operating one of said platens to open and close said press, control means for said power means normally biased to operate said press to open position, means for energizing said control means to operate said press to closed position, and means for preventing energization of said control means except when said movable carriage is in said normal position outside of said press.

11. A combination according to claim 2 and including a scraper element carried by said movable carriage at the forward end thereof and operating to dislodge molded articles from the mold parts carried by the upper platen, a jet-pipe carried by said carriage at the forward end thereof for directing air blasts downwardly and forward of said carriage to blow molded articles from the mold parts of said lower platen, power means for operating one of said platens to open and close said press, control means for said power means normally biased to a position to operate said press to open position, means for energizing said control means to close said press, and means for preventing energization of said control means except when said movable carriage is in said normal position outside of said press.

WILLIAM STRAUSS.